Patented Sept. 14, 1937

2,092,788

UNITED STATES PATENT OFFICE 2,092,788

LUMINOUS CEMENT

Ozro Dodge Thomas, Los Angeles, Calif., assignor of one-half to Laurence B. Martin, Los Angeles, Calif.

No Drawing. Application November 27, 1935, Serial No. 51,885

3 Claims. (Cl. 106—24)

My invention relates to luminous cement.

It is an object of this invention to provide a method to make luminous material, and in particular a luminous hydraulic cement having superior luminosity and also retaining such luminosity for a longer period than the luminous materials of the prior art.

It is well known that sulfides of many metals are luminous, for instance, calcium sulfide has been used as a luminous agent in compositions such as paints and cements. I have discovered that when calcium sulfide is intimately combined with sulfides of certain other metals a material of superior luminosity is obtained.

One objection of luminous sulfide material of the prior art is that when exposed to the water hydrolyzation of the sulfides gradually takes place generating objectionable sulphurous odors. I prevent such hydrolyzation by filming the minute grains of the luminous material with an agent such as paraffin oil to exclude the air and moisture therefrom.

With the above and other objects in view, which will appear as the description proceeds, my invention consists in the steps of the method and the resulting product hereinafter described and claimed.

The following is the preferred example of my method and the resulting product:

Ninety-two (92%) per cent of calcium sulfate is mixed with eight (8%) per cent of a metalliferous ore found in Goodsprings, county of Clark, Nevada, which assays approximately as follows:

| | Per cent |
|---|---|
| Cadmium | 5 |
| Bismuth | 1½ |
| Lead sulfide | 1½ |
| Zinc sulfide | 15 |
| Vanadium | 1⅝ |
| Strontium | ½ |

The mixture is pulverized and heated with about ten per cent of coke to a temperature of about 850° F. which reduces the calcium sulfate to sulfide, and converts the cadmium, bismuth, vanadium and strontium to their corresponding sulfides and forms a semi-clinker. Now .2% of paraffin oil is added to the mass while still hot. The heat will disseminate the paraffin oil thoroughly in the clinkered mass which is now ground to 150 mesh, forming a powder, the paraffin oil being of a quantity insufficient to interfere with the pulverization. The paraffin oil forms a microscopic film about the minute powdered particles, preventing access of air thereto. The powder thus prepared is the luminous material proper, and while intended to be mixed with hydraulic cement, may be used as such for making luminous paints, varnishes and compositions of all kinds.

When to be used for making luminous cement the powdered luminous material is added to hydraulic cement in the proportion of twenty per cent of luminous material and eighty per cent of the cement. It appears necessary to impart the superior luminosity to the finished luminous cement that the luminous material be added to the hot cement clinkers as they come from the kiln. The mixture of the cement clinkers and powdered luminous material is now ground together, preferably not to exceed 150 mesh. It appears that if ground more finely, the luminous luminosity of the cement is decreased.

In order to increase the luminosity of the hydraulic cement the following modification of the method may be used.

The calcined luminous material is ground to 150 mesh without the addition of the paraffin oil, and is placed in vats and mixed with water to form a slurry through which sulphurous acid fumes such as obtained by the calcination of gypsum with a reducing agent, such as coke, is caused to bubble. It seems that additional sulfides are formed in the slurry, which is dried and mixed with paraffin oil and ground with the hot cement clinkers as before.

In place of the paraffin oil other hydrocarbons having relatively high volatilization point such as paraffin, also waxes and gums, may be used, and for the sake of brevity I intend the term paraffin oil in the claims to cover such materials as chemical equivalents of paraffin oil.

It will be obvious to those skilled in the art that the proportions of the ingredients as heretofore stated may be varied within wide limits and yet give good results, tho for best results the proportions stated are preferred.

My luminous material I have discovered not only absorbs and returns the light rays but also ultra violet rays which, as well known, have beneficial therapeutic values, and therefore my luminous material is especially adapted for use in hospitals, nurseries and sickrooms.

Under certain circumstances it may be desirable to add a radioactive material such as powdered carnotite, a small quantity thereof being sufficient, say one-half of one per cent. As well known the carnotite increases the capacity of the luminous material to absorb and return actinic rays.

Various changes may be made by those skilled in the art in the steps of the method without departing from the spirit of my invention as claimed.

I claim:

1. A method of making a luminous material comprising adding a mixture of the sulfides of the following materials: calcium, cadmium, bismuth, lead, zinc, vanadium, and strontium, in powder form to a mass of hot clinkers of hydraulic cement, and grinding the same together.

2. A method of making a luminous material comprising adding a powdered luminous metallic sulfide to hot clinkers of hydraulic cement and grinding the same together.

3. A method of making a luminous material comprising adding a powdered luminous metallic sulfide to hot clinkers of hydraulic cement and grinding the same together, in the proportion of twenty percent of metal sulfide to eighty percent of cement clinkers.

O. D. THOMAS.